(12) United States Patent
Yang et al.

(10) Patent No.: US 12,535,587 B2
(45) Date of Patent: Jan. 27, 2026

(54) OBJECT TRACKING

(71) Applicant: HEWLETT-PACKARD DEVELOPMENT COMPANY, L.P., Spring, TX (US)

(72) Inventors: Guoxing Yang, Spring, TX (US); Alexander Wayne Clark, Spring, TX (US); Robson Teles, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 895 days.

(21) Appl. No.: 17/777,855

(22) PCT Filed: Dec. 13, 2019

(86) PCT No.: PCT/US2019/066183
§ 371 (c)(1),
(2) Date: May 18, 2022

(87) PCT Pub. No.: WO2021/118588
PCT Pub. Date: Jun. 17, 2021

(65) Prior Publication Data
US 2022/0413145 A1    Dec. 29, 2022

(51) Int. Cl.
*G06T 7/246*    (2017.01)
*G01S 17/66*    (2006.01)
*G01S 17/894*   (2020.01)

(52) U.S. Cl.
CPC ............ *G01S 17/66* (2013.01); *G01S 17/894* (2020.01); *G06T 7/246* (2017.01)

(58) Field of Classification Search
None
See application file for complete search history.

(56) References Cited

U.S. PATENT DOCUMENTS

| | | | |
|---|---|---|---|
| 6,614,518 B1 * | 9/2003 | Ishikawa | G01J 1/42 356/218 |
| 7,965,866 B2 | 6/2011 | Wang et al. | |
| 8,260,262 B2 | 9/2012 | Ben Ayed | |
| 8,451,220 B2 | 5/2013 | El Dokor et al. | |
| 8,891,825 B2 | 11/2014 | Baele et al. | |
| 9,272,202 B2 | 3/2016 | El Dokor et al. | |

(Continued)

FOREIGN PATENT DOCUMENTS

| | | | | |
|---|---|---|---|---|
| CA | 2822980 A1 * | 7/2012 | | B25J 5/007 |
| CN | 112783307 A * | 5/2021 | | G06F 1/263 |

(Continued)

OTHER PUBLICATIONS

Bevilacqua, A., et al., "People Tracking Using a Time-of-Flight Depth Sensor," University of Bologna, Italy, 2006 IEEE International Conference on Video and Signal Based Surveillance, 2006, 5 pages.

(Continued)

*Primary Examiner* — Ted W Barnes
(74) *Attorney, Agent, or Firm* — Quarles & Brady LLP

(57) ABSTRACT

An example computing device includes a time of flight (ToF) sensor to generate frames of sensor data. The computing device includes a processor to: identify an object appearing in the frames; track a centroid of the object frame-by-frame; and determine whether a user is present within operating range of the computing device based on the tracking.

17 Claims, 9 Drawing Sheets

(56) References Cited

U.S. PATENT DOCUMENTS

| | | | | |
|---|---|---|---|---|
| 9,736,327 | B2* | 8/2017 | Akiyama | H04N 1/00896 |
| 9,763,097 | B2 | 9/2017 | Robinson et al. | |
| 10,095,449 | B2* | 10/2018 | Yokoyama | G03G 15/5004 |
| 10,162,421 | B2* | 12/2018 | Wei | G06F 3/017 |
| 2002/0133761 | A1* | 9/2002 | Numano | G06F 1/1677 |
| | | | | 714/57 |
| 2012/0027266 | A1 | 2/2012 | Ren et al. | |
| 2013/0201272 | A1* | 8/2013 | Enbom | H04M 3/567 |
| | | | | 348/E7.078 |
| 2013/0216050 | A1* | 8/2013 | Chen | H04B 3/23 |
| | | | | 381/56 |
| 2013/0223696 | A1 | 8/2013 | Azar et al. | |
| 2013/0300648 | A1* | 11/2013 | Kim | G04G 21/00 |
| | | | | 345/156 |
| 2014/0253688 | A1* | 9/2014 | Metz | G01S 7/4915 |
| | | | | 348/46 |
| 2015/0120057 | A1* | 4/2015 | Wong | B25J 9/1697 |
| | | | | 901/1 |
| 2015/0169053 | A1* | 6/2015 | Bozarth | G06F 1/3234 |
| | | | | 345/156 |
| 2015/0178101 | A1* | 6/2015 | Krishnaswamy | G06F 9/44505 |
| | | | | 713/100 |
| 2015/0242605 | A1 | 8/2015 | Du et al. | |
| 2016/0003937 | A1* | 1/2016 | Metz | G01S 7/48 |
| | | | | 356/5.01 |
| 2016/0004293 | A1* | 1/2016 | Park | G09G 3/344 |
| | | | | 345/204 |
| 2016/0071476 | A1* | 3/2016 | Jeon | G09G 3/18 |
| | | | | 345/212 |
| 2016/0249134 | A1* | 8/2016 | Wang | H04R 3/005 |
| 2016/0274738 | A1* | 9/2016 | Hsiao | G06F 1/3275 |
| 2018/0143318 | A1* | 5/2018 | Skowronek | G01S 3/802 |
| 2018/0143321 | A1* | 5/2018 | Skowronek | G01S 17/66 |
| 2018/0220231 | A1* | 8/2018 | Thakkar | H04M 3/568 |
| 2019/0113966 | A1* | 4/2019 | Connellan | G01C 21/1656 |
| 2019/0379861 | A1* | 12/2019 | Clark | G06T 7/593 |
| 2020/0143154 | A1* | 5/2020 | Ette | G06V 40/28 |
| 2020/0195804 | A1* | 6/2020 | Saeda | H04N 1/344 |
| 2021/0099146 | A1* | 4/2021 | Lee | G06T 7/73 |
| 2021/0127204 | A1* | 4/2021 | Porta | G06N 20/20 |

FOREIGN PATENT DOCUMENTS

| | | | | |
|---|---|---|---|---|
| CN | 111289988 | B * | 2/2024 | G01S 17/08 |
| EP | 3300459 | A1 * | 3/2018 | H05B 47/16 |
| RU | 2691201 | C1 * | 6/2019 | H04L 9/0877 |

OTHER PUBLICATIONS

Niinuma, K., et al., "Continuous User Authentication Using Temporal Information," Apr. 14, 2010, SPIE 7667, Biometric Technology for Human Identification VII, 76670L, 11 pages.

Patel, V, M., et al., "Continuous User Authentication on Mobile Devices," IEEE Signal Processing Magazine, vol. X, No. X, 2016, pp. 1-24.

* cited by examiner

| | 102 | 93 | 93 | 92 | 92 | 95 | |
|---|---|---|---|---|---|---|---|
| 97 | 94 | 93 | 95 | 93 | 90 | 93 | |
| 93 | 93 | 93 | 95 | 92 | 90 | 91 | |
| 96 | 90 | 90 | 92 | 90 | 89 | 95 | 92 |
| 90 | 88 | 88 | 89 | 89 | 88 | 87 | 93 |
| 92 | 90 | 91 | 92 | 91 | 90 | 89 | 91 |
| 89 | 90 | 94 | 95 | 94 | 93 | 92 | 90 |
| 91 | 93 | 98 | 97 | 96 | 96 | 92 | 91 |

Fig. 3A

OBJECT TRACKING

BACKGROUND

For any computing device, it is helpful to determine if the device is actively being used. This indication can help the device determine the power state and to set security policies. For instance, if the user has walked away from the device, locking the device could thwart an intruder from snooping. Furthermore, the device may transition itself into a low power standby state to conserve battery energy. Computing devices may rely on user interaction (e.g., via keyboard or mouse clicks) and an idle timer to determine active usage of the device. If there is no activity for an extended amount of time, a decision is made about the user not being present, and actions may be taken to increase security and power efficiency.

BRIEF DESCRIPTION OF THE DRAWINGS

FIGS. 3A-3C are diagrams illustrating plan view height maps generated by the computing device shown in FIGS. 1 and 2 according to one example.

DETAILED DESCRIPTION

Figure 1:
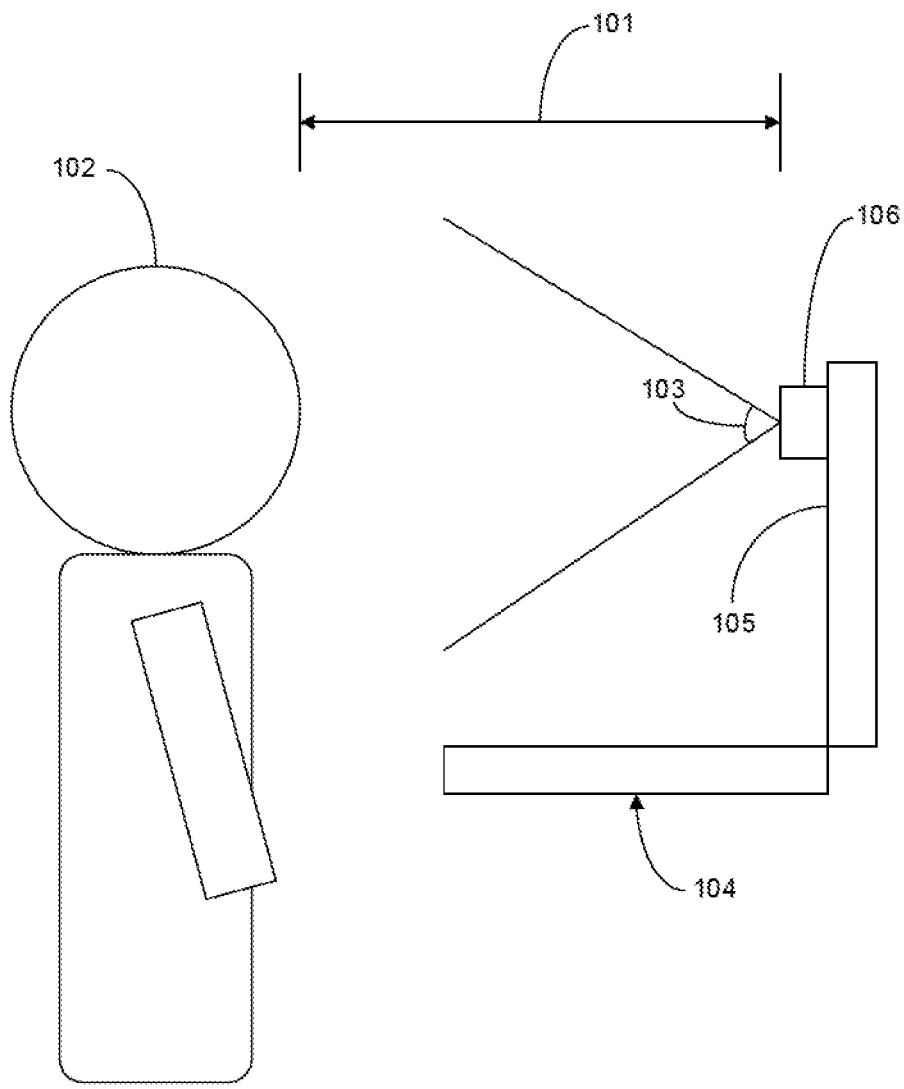
FIG. 1 is a diagram illustrating a computing device with object tracking capabilities according to one example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Modern operating systems provide techniques for system and device power management. Timer-based features may be used to provide power savings. For example, if user activity is absent for more than the threshold of an idle timer, the system may start saving power by going into lower power states. The power saving starts when the threshold is reached. The idle timer may also be referred to as an inactivity timer. Timer-based locks for computing devices have security issues and may waste host system resources.

Some examples disclosed herein are directed to continuous user authentication and contextual audio mode switching by real-time human object tracking using a time of flight (ToF) sensor. The ToF sensor may emit a laser or light pulse and measure distance based on when it receives the reflection back. Some examples are directed to performing object tracking to detect the presence of a user within operating range of a computing device, and, based on the sensed data, control: (1) user authentication; (2) the power state of the device; and (3) a mode of a microphone of the device. In some examples, the presence sensor may be a ToF sensor.

Some examples are directed to a real-time object tracking method that uses depth maps from a multi-zone ToF sensor to track an object (e.g., a user) by tracking the centroid of the object frame by frame. Tracking may be based on the position and speed of the centroid in 3D space. Based on a low sensor sampling rate and average human object movement speed in front of a computer, the centroid position change on an [X, Y] plane and its height [Z] change should be within certain limits from frame [t−1] to frame [t]. If so, the object may be considered still being tracked at the current frame.

Examples of the object tracking method may be used in three different use cases: (1) continuous user authentication; (2) keeping the computing device on after reaching the idle timer threshold; and (3) contextual audio mode switching of a microphone of the computing device.

For the first use case, the method may detect the object at the center of the field of view (FoV) of the ToF sensor at the time of user authentication (e.g., user login), and performs continuous user authentication based on the tracking of the object. The method may lock the computing device when tracking is lost (e.g., due to the object moving out of the FoV), and may also switch the computing device to a lower power state. This continuous user authentication provides high security and privacy when a user is using a computing device in a public place.

For the second use case, the method may detect the object at the center of the FoV at the time of user authentication (e.g., user login), and control a power state of the computing device based on the tracking of the object. For example, even if a user is not manually interacting with the computing device for a period of time that exceeds the idle timer threshold, the method may maintain the computing device in a normal power state (e.g., screen remains on; screensaver is not activated; and the computing device is not put in a sleep mode) as long as the user is being tracked. For example, a user may be sharing a screen of a computing device, and discussing it with others in a conference room, but not manually interacting with the computing device. Some systems may cause the screen to go dark after the idle timer threshold has been reached, but some examples disclosed herein maintain the computing device in a normal power state with the screen on as long as the user is being tracked.

For the third use case, the method may detect the object at the center of the FoV at the time the user joins a conference call. The method may switch a microphone of the computing device between a personal mode with noise cancellation and a conference mode without noise cancellation based on the tracking of the object. The method may pick a better audio mode automatically based on the user's tracked location.

Examples disclosed herein, which use a ToF sensor for object tracking, may provide low power and high accuracy object tracking, enhance productivity, increase security and power savings, and provide an enhanced conferencing experience.

FIG. 1 is a diagram illustrating a computing device 104 with object tracking capabilities according to one example. In the illustrated example, a ToF sensor 106 may be positioned on, or in close proximity to, a display 105 of the computing device 104. In some examples, the ToF sensor 106 determines a distance 101 of a user 102 from the sensor 106. The ToF sensor 106 may be a multi-zone laser ranging ToF sensor that includes an array (e.g., 8×8, or other array) of zones, and that projects a square field of view (FOV) 103 onto a scene and determines separate distance values for each individual zone. In some examples, the FOV 103 is a 61 degrees diagonal square system FOV. In some examples, an on-screen display (OSD) menu may be used in display 105 to disable and enable features of the ToF sensor 106 and object tracking, and to select options for the object tracking.

Figure 2:
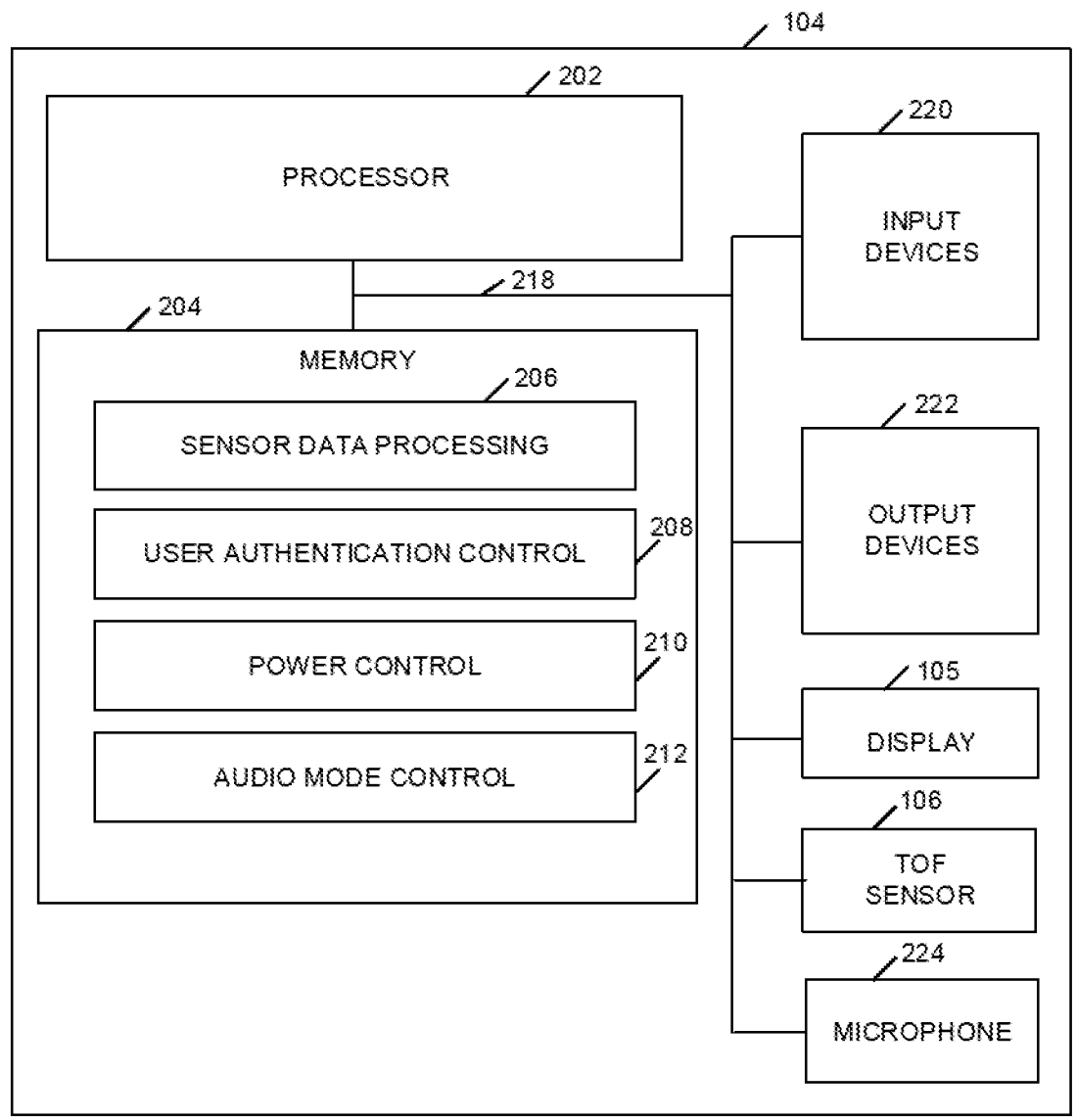
FIG. 2 is a block diagram illustrating elements of the computing device shown in FIG. 1 according to one example.

FIG. 2 is a block diagram illustrating elements of the computing device 104 shown in FIG. 1 according to one example. Computing device 104 includes a processor 202, a memory 204, input devices 220, output devices 222, display 105, ToF sensor 106, and microphone 224. In the illustrated example, processor 202, memory 204, input devices 220, output devices 222, display 105, ToF sensor 106, and microphone 224 are communicatively coupled to each other through communication link 218. The ToF sensor 106 may be embedded within the frame of the display 105, mounted along one of the edges of the display 105, or mounted in a suitable location in the room in which the computing device 104 is located.

Input devices 220 include a keyboard, mouse, data ports, and/or other suitable devices for inputting information into device 104. Output devices 222 include speakers, data ports, and/or other suitable devices for outputting information from device 104.

Processor 202 includes a Central Processing Unit (CPU) or another suitable processor. In one example, memory 204 stores machine readable instructions executed by processor 202 for operating device 104. Memory 204 includes any suitable combination of volatile and/or non-volatile memory, such as combinations of Random Access Memory (RAM), Read-Only Memory (ROM), flash memory, and/or other suitable memory. These are examples of non-transitory computer readable storage media. The memory 204 is non-transitory in the sense that it does not encompass a transitory signal but instead is made up of a memory component to store machine executable instructions for performing techniques described herein.

Memory 204 stores sensor data processing set of instructions 206, user authentication control set of instructions 208, power control set of instructions 210, and audio mode control set of instructions 212. Processor 202 executes instructions of sets of instructions 206, 208, 210, and 212 to perform the techniques described herein. It is noted that some or all of the functionality of sets of instructions 206, 208, 210, and 212 may be implemented using cloud computing resources.

In some examples, ToF sensor 106 may report frames of sensor data at a predefined interval (e.g., 5 Hz) to the sensor data processing module 206 for processing. In one example, each frame may include an array (e.g., 8×8) of distance values, and may also be referred to as a depth map. In some examples, the sensor data processing set of instructions 206 may identify and track a centroid of the user 102 based on the received frames of sensor data, and determine whether the user 102 is present within operating range of the computing device 104 based on the tracking. Sensor data processing set of instructions 206 may also inform sets of instructions 208, 210, and 212 of whether the user 102 is present within operating range of the computing device 104.

In some examples, set of instructions 206 may use depth maps from ToF sensor 106 to track an object (e.g., a user) by tracking the centroid of the object frame by frame. Set of instructions 206 may apply range thresholding to the range data from sensor 106 to reduce background noise and define the pyramid of interest in front of the sensor 106. In one example, any range larger than 150 cm may be filtered out by set of instructions 206. Next, set of instructions 206 may build a plan view height map that is projected onto an [X, Y] plane at a 150 cm range, where [Z=Height=150 cm−Range] for each of the 64 zones.

Tracking may be based on the position and speed of the centroid in 3D space. The centroid position [X, Y] at frame [t−1] may be used to detect a connected component within the plan view map at frame [t], and then the current centroid location in the 3D space is calculated. Based on a low sensor sampling rate (e.g., 5 Hz) and average human object movement speed in front of a computer, the centroid position change on an [X, Y] plane and its height [Z] change should be within certain limits from frame [t−1] to frame [t]. If so, the object is considered still being tracked at the current frame [t].

In some examples, the sensor data processing set of instructions 206 may begin tracking the user 102 at the time of user authentication. When the sensor data processing set of instructions 206 loses tracking of the user 102 and determines that the user 102 is not currently present at the computing device 104, the set of instructions 206 may signal the user authentication control set of instructions 208 to lock the computing device 104. For example, tracking of the user 102 may be lost due to the user 102 moving out of the FoV of the sensor 106, or a large object (e.g., another person) moving in between the sensor 106 and the user 102 blocking the FoV of the sensor 106 completely. The set of instructions 206 may also signal the power control set of instructions 210 to cause the computing device 104 to enter a lower power state (e.g., a sleep state). After the set of instructions 208 may lock the computing device 104, the set of instructions 208 then prompts the user 102 to perform another authentication process to unlock the computing device.

In some examples, the sensor data processing set of instructions 206 may begin tracking the user 102 at the time of user authentication, and signal power control set of instructions 210 based on the tracking to control a power state of the computing device 104. For example, if the user 102 is not manually interacting with the computing device 104 for a period of time that exceeds an idle timer threshold, but the sensor data processing set of instructions 206 indicates to the power control set of instructions 210 that the user 102 is still present within operating range of the computing device 104, the set of instructions 210 may maintain the computing device 104 in a normal power state (e.g., screen remains on; screensaver is not activated; and the computing device 104 is not put in a sleep mode) as long as the user 102 is being tracked.

In some examples, the sensor data processing set of instructions 206 may begin tracking the user 102 at the time the user 102 joins a conference call. The set of instructions 206 may then signal the audio mode control set of instructions 212 to switch the microphone 224 of the computing device 104 between a personal mode with noise cancellation and a conference mode without noise cancellation based on the tracking of the object. For example, the audio mode control set of instructions 212 may maintain the microphone 224 in a personal mode as long as the user 102 is being tracked, and switch the microphone 224 to a conference mode when tracking of the user 102 is lost. The tracking may restart when a moving object is detected at the center of the FOV of the sensor 106, at which time the set of instructions 212 may switch the microphone 224 back to the personal mode.

Figure 3B:
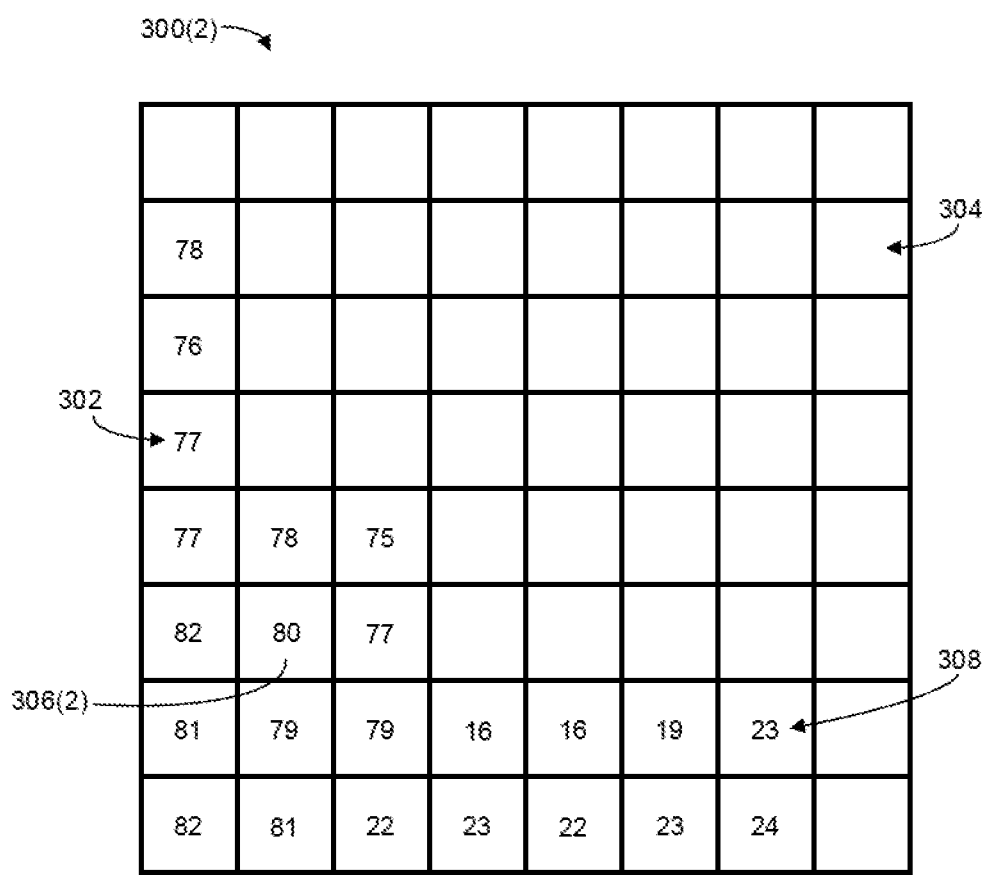
Figure 3C:
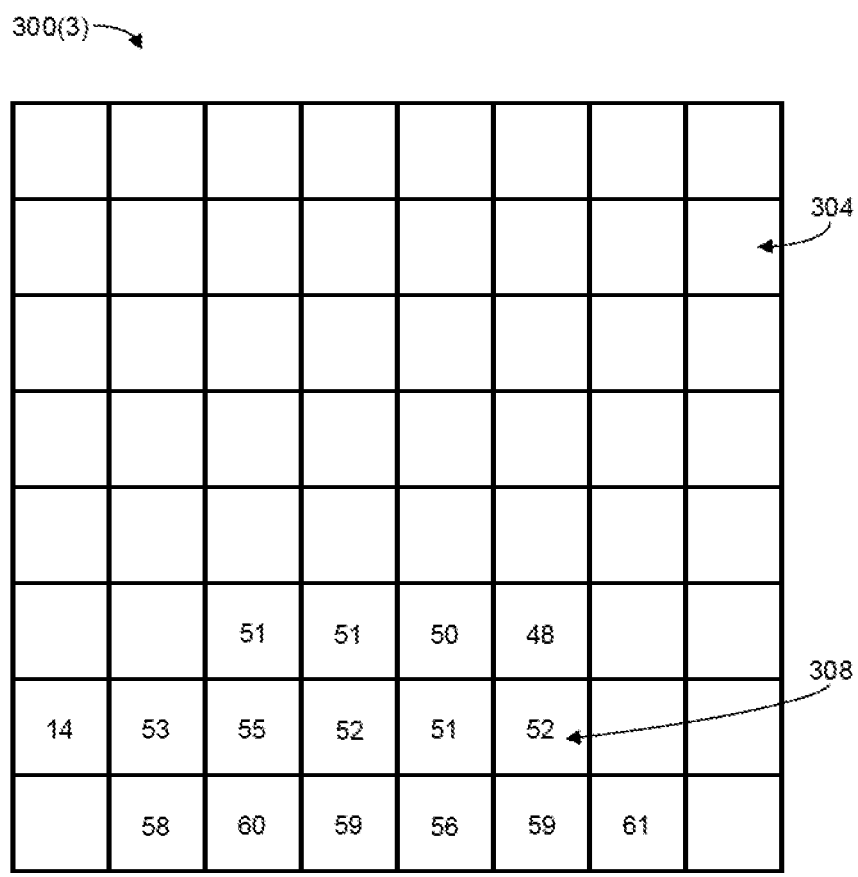

FIGS. 3A-3C are diagrams illustrating plan view height maps 300(1)-300(3) generated by the computing device shown in FIGS. 1 and 2 according to one example. In some examples, the plan view height maps 300(1)-300(3) may be generated by filtering raw 8×8 range data received from ToF sensor 106 to filter out ranges greater than a threshold distance (e.g., 150 cm) from the ToF sensor 106, and the plan view height map may be projected to a 150 cm plane perpendicular to the sensor viewing. The height values in the zones of the maps 300(1)-300(3) equal 150 minus the range values from the ToF sensor 106 in centimeters.

As shown in FIG. 3A, an object 302 being tracked, which represents a user sitting on a chair in front of the computing device 104, is positioned near a center of the map 300(1) and includes sixty height values from sixty zones. Zone 306(1) is the calculated centroid position of the object 302 shown in FIG. 3A. Two regions 304 represent four zones without a valid height value.

As shown in FIG. 3B, the user has moved to the left of the FOV, and the object 302 being tracked has correspondingly moved to the left. The object 302 now includes fourteen height values from fourteen zones. Zone 306(2) is the new calculated centroid position of the object 302 shown in FIG. 3B. Region 304 represents forty-one zones without a valid height value. Region 308 represents nine zones with valid height values, but that are not considered part of the object 302 being tracked. The region 308 corresponds to a portion of the chair that the user is sitting on.

As shown in FIG. 3C, the user has moved farther to the left and out of the FOV, and the object 302 being tracked has correspondingly moved off of the map 300(3), and tracking has been lost. Region 304 represents forty-eight zones without a valid height value. Region 308 represents sixteen zones with valid height values, but that are not considered part of the object 302 being tracked.

Figure 4:
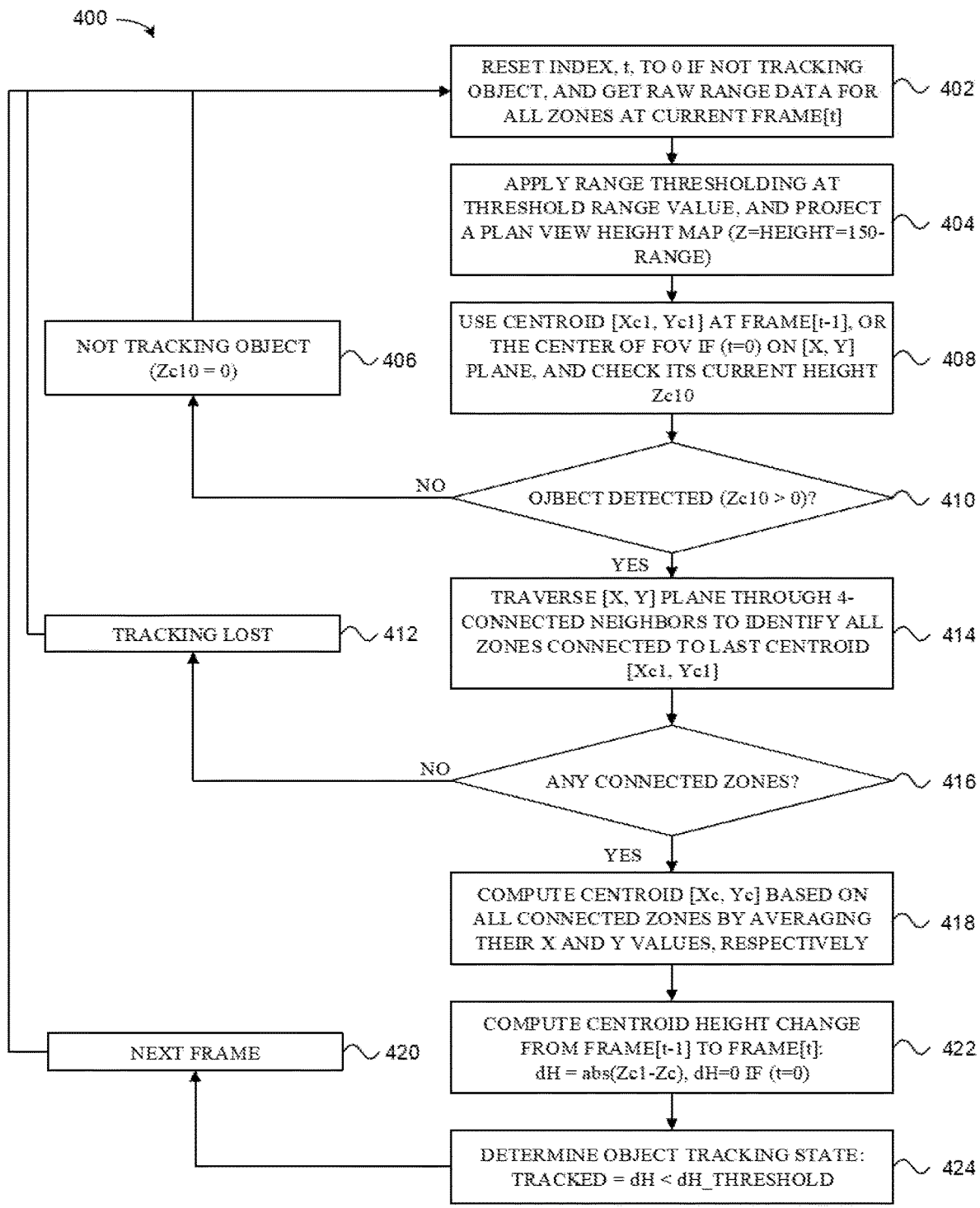
FIG. 4 is a flow diagram illustrating a method for tracking an object according to one example.

FIG. 4 is a flow diagram illustrating a method 400 for tracking an object according to one example. In some examples, the object in method 400 may be a user 102 of computing device 104, and computing device 104 may perform method 400 to track the user 102. At 402 in method 400, an index, t, may be reset to zero if an object is not currently being tracked, and raw range data may be obtained from the ToF sensor for all zones at the current frame[t]. The index, t, is the current frame sequence number when an object is being tracked, and t=0 if an object is not currently being tracked. At 404, range thresholding may be applied to the raw range data at a threshold range value (e.g., 150 cm), and a plan view height map may be projected (Z=height=150−range value). The plan view height map may be projected to a 150 cm plane [X, Y] perpendicular to the sensor viewing. At 408, the method 400 may use the centroid [Xc1, Yc1] at frame[t−1], or the center of the FOV if (t=0) on the [X, Y] plane, and check its current height Zc10. The 3D values of the last centroid are [Xc1, Yc1, Zc1]. At 410, the method 400 may determine whether an object has been detected (e.g., Zc10>0). If it is determined at 410 that an object has not been detected, the method 400 moves to 406, which indicates that an object is not being tracked (Zc10=0), and then returns to 402.

If it is determined at 410 that an object has been detected, the method 400 moves to 414. At 414, the method 400 may traverse the [X, Y] plane through 4-connected neighbors to identify all zones connected to the last centroid [Xc1, Yc1]. In some examples, a connected threshold value of 10 cm, which is based on the human body contour, is used in identifying connected zones. At 416, the method 400 may determine whether any connected zones have been identified. If it is determined at 416 that no connected zones have been identified, the method 400 moves to 412, which indicates that tracking has been lost, and then returns to 402.

If it is determined at 416 that a connected zone has been identified, the method 400 moves to 418. At 418, the current centroid [Xc, Yc] may be computed based on all of the identified connected zones by averaging their X and Y values, respectively. The 3D values of the current centroid are [Xc, Yc, Zc]. At 422, the centroid height change from frame [t−1] to frame[t] may be computed: dH=abs(Zc1−Zc), dH=0 if (t=0). At 424, the object tracking state may be determined: Tracked=dH<dH_Threshold. For the centroid height change threshold (dH_Threshold), some examples assume a maximum moving speed in any direction of 100 cm/s, which, at a 5 Hz frame rate, corresponds to a maximum movement of 20 cm per frame. Thus, a dH_Threshold of slightly greater than 20 cm may be chosen (e.g., 25 cm), and tracking may be considered to be lost if the centroid movement between frames exceeds this value. After the object tracking state is determined at 424, the method 400 moves to 420, which indicates that the next frame is to be processed, and returns to 402.

Figure 5:
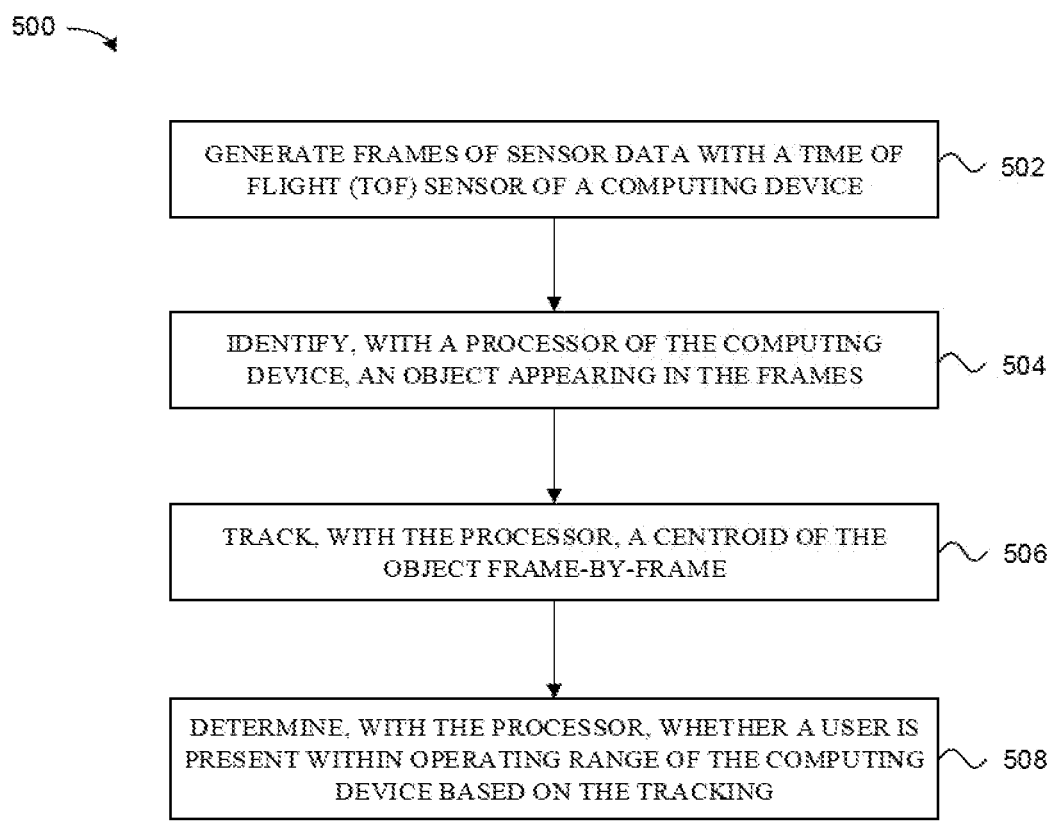
FIG. 5 is a flow diagram illustrating a method for tracking an object according to another example.

FIG. 5 is a flow diagram illustrating a method 500 for tracking an object according to another example. In one example, computing device 104 (FIGS. 1 and 2) may perform method 500. At 502 in method 500, a time of flight (ToF) sensor of a computing device may generate frames of sensor data. At 504, a processor of the computing device may identify an object appearing in the frames. At 506, the processor may track a centroid of the object frame-by-frame. At 508, the processor may determine whether a user is present within operating range of the computing device based on the tracking.

Figure 6:
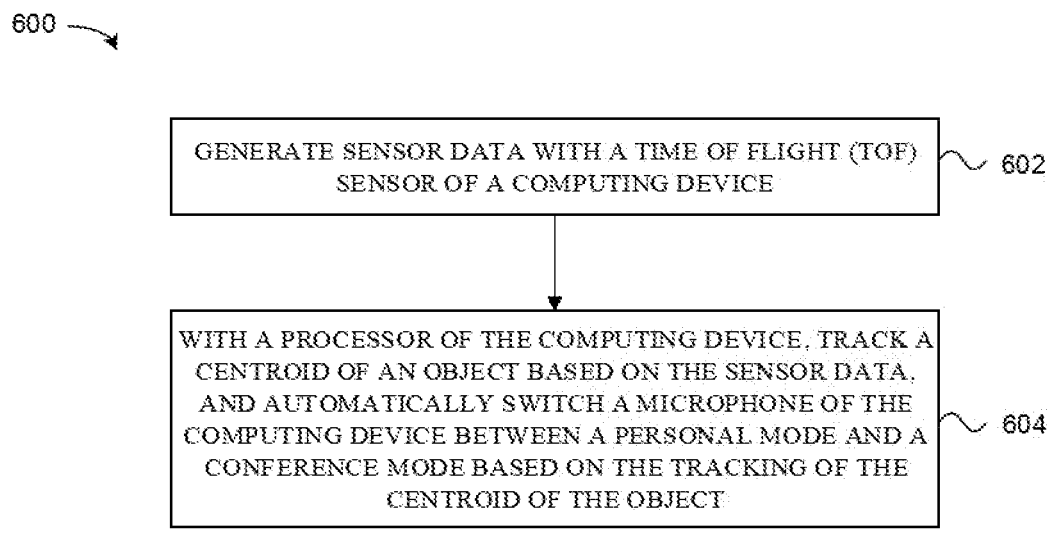
FIG. 6 is a flow diagram illustrating a method for tracking an object and controlling a microphone mode according to one example.

FIG. 6 is a flow diagram illustrating a method 600 for tracking an object and controlling a microphone mode according to one example. In one example, computing device 104 (FIGS. 1 and 2) may perform method 600. At 602 in method 600, a time of flight (ToF) sensor of a computing device may generate sensor data. At 604, a processor of the computing device may track a centroid of an object based on the sensor data, and automatically switch a microphone of the computing device between a personal mode and a conference mode based on the tracking of the centroid of the object.

Figure 7:
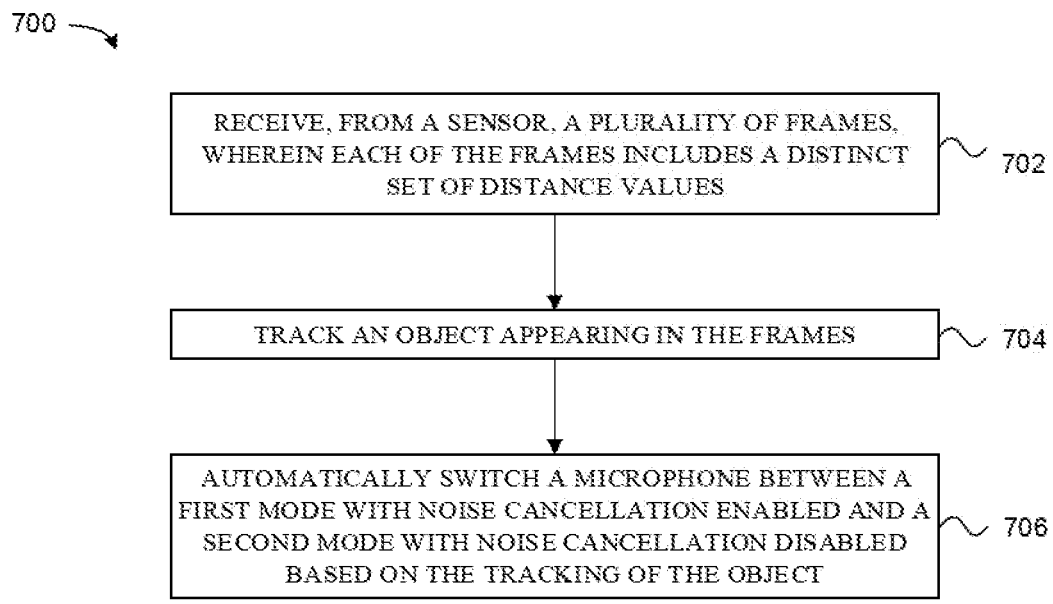
FIG. 7 is a flow diagram illustrating a method for tracking an object and controlling a microphone mode according to another example.

FIG. 7 is a flow diagram illustrating a method 700 for tracking an object and controlling a microphone mode according to another example. In one example, computing device 104 (FIGS. 1 and 2) may perform method 700. At 702, the method 700 includes receiving, from a sensor, a plurality of frames, wherein each of the frames includes a distinct set of distance values. At 704, the method 700 may include tracking an object appearing in the frames. At 706, the method 700 may include automatically switching a microphone between a first mode with noise cancellation enabled and a second mode with noise cancellation disabled based on the tracking of the object.

One example is directed to a computing device, which includes a time of flight (ToF) sensor to generate frames of sensor data, and a processor to: identify an object appearing in the frames; track a centroid of the object frame-by-frame; and determine whether a user is present within operating range of the computing device based on the tracking.

The computing device may include a microphone, and the processor may automatically switch the microphone between a personal mode and a conference mode based on the tracking. The processor may cause the computing device to be locked immediately in response to a determination that the user is not present at the computing device based on tracking of the user that starts when the user logs in to the computing device. The processor may maintain the computing device in a full power state after expiration of an inactivity timer in response to a determination that the user is present at the computing device.

In some examples, the processor may track the position of the centroid in three dimensions. The processor may track the speed of the centroid in three dimensions. The processor may determine whether a change in a two dimensional X,Y position of the centroid between successive ones of the frames is within a first threshold. The processor may determine whether a change in Z position of the centroid between successive ones of the frames is within a second threshold.

In some examples, the processor may filter out sensor data having a range greater than a threshold distance from the ToF sensor. In some examples, the ToF sensor may be a multi-zone ToF sensor that includes an array of zones and that determines a separate distance value for each of the zones.

Another example is directed to a computing device, which includes a microphone, and a time of flight (ToF) sensor to generate sensor data. The computing device also includes a processor to track a centroid of an object based on the sensor data, and automatically switch the microphone between a personal mode and a conference mode based on the tracking of the centroid of the object.

In some examples, the processor may track position and speed of the centroid of the object in three dimensions. The ToF sensor may be a multi-zone ToF sensor that includes an array of at least 64 zones and that determines a separate distance value for each of the zones.

Yet another example is directed to a non-transitory computer-readable storage medium storing instructions that, when executed by a processor of a computing device, cause the computing device to: receive, from a sensor, a plurality of frames, wherein each of the frames includes a distinct set of distance values; track an object appearing in the frames; and automatically switch a microphone between a first mode with noise cancellation enabled and a second mode with noise cancellation disabled based on the tracking of the object.

In some examples, the non-transitory computer-readable storage medium may further store instructions that, when executed by the processor, cause the computing device to: track position and speed of a centroid of the object; and automatically switch the microphone between the first mode and the second mode based on the tracking of the position and speed of the centroid.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A computing device, comprising:
    a time of flight (ToF) sensor to generate frames of sensor data; and
    a processor to:
        identify an object appearing in the frames;
        track a centroid of the object frame-by-frame;
        determine whether a user is present within operating range of the computing device based on the tracking; and
        maintain the computing device in a full power state after expiration of an inactivity timer in response to a determination that the user is present at the computing device.

2. The computing device of claim 1, wherein the computing device includes a microphone, and wherein the processor is to automatically switch the microphone between a personal mode and a conference mode based on the tracking.

3. The computing device of claim 1, wherein the processor is to cause the computing device to be locked immediately in response to a determination that the user is not present at the computing device based on tracking of the user that starts when the user logs in to the computing device.

4. The computing device of claim 1, wherein the processor is to track position of the centroid in three dimensions.

5. The computing device of claim 4, wherein the processor is to track speed of the centroid in three dimensions.

6. The computing device of claim 5, wherein the processor is to determine whether a change in a two dimensional X, Y position of the centroid between successive ones of the frames is within a first threshold.

7. The computing device of claim 6, wherein the processor is to determine whether a change in Z position of the centroid between successive ones of the frames is within a second threshold.

8. The computing device of claim 1, wherein the processor is to filter out sensor data having a range greater than a threshold distance from the ToF sensor.

9. The computing device of claim 1, wherein the ToF sensor is a multi-zone ToF sensor that includes an array of zones and that is to determine a separate distance value for each of the zones.

10. A computing device, comprising:
    a microphone;
    a time of flight (ToF) sensor to generate sensor data; and
    a processor to;
        track a centroid of an object based on the sensor data;
        automatically switch the microphone between a personal mode and a conference mode based on the tracking of the centroid of the object;
        automatically switch a power state of the computing device between a full normal power state and a power saving state based on the tracking of the centroid of the object; and
        maintain the computing device in the full power state after expiration of an inactivity timer in response to a determination that the object is present at the computing device.

11. The computing device of claim 10, wherein the processor is to track position and speed of the centroid of the object in three dimensions.

12. The computing device of claim 10, wherein the ToF sensor is a multi-zone ToF sensor that includes an array of at least 64 zones and that is to determine a separate distance value for each of the zones.

13. The computing device of claim 10, wherein the computing device is switched into the full power state when a presence of the object is detected.

14. The computing device of claim 13, wherein the computing device is switched into the power saving state when the presence of the object is not detected, and the object is not manually interacting with the computing device for a period of time that exceeds an idle timer threshold.

15. A non-transitory computer-readable storage medium storing instructions that, when executed by a processor of a computing device, cause the computing device to:
- receive, from a sensor, a plurality of frames, wherein each of the frames includes a distinct set of distance values;
- track an object appearing in the frames;
- automatically switch a microphone between a first mode with noise cancellation enabled and a second mode with noise cancellation disabled based on the tracking of the object;
- automatically switch the computing device between a full power state with a screen of the computing device remaining on and a lower power state with the computing device being put in a sleep mode; and
- maintain the computing device in the full power state after expiration of an inactivity timer in response to a determination that the object is present at the computing device.

16. The non-transitory computer-readable storage medium of claim 15, and further storing instructions that, when executed by the processor, cause the computing device to:
- track position and speed of a centroid of the object; and
- automatically switch the microphone between the first mode and the second mode based on the tracking of the position and speed of the centroid.

17. The non-transitory computer-readable storage medium of claim 15, wherein the computing device is switched into the full power state after expiration of an inactivity timer and the object is detected.

* * * * *